United States Patent
Garcia Andarcia et al.

(10) Patent No.: US 8,603,226 B2
(45) Date of Patent: Dec. 10, 2013

(54) CYCLIC-AMINE-COMPRISING ABSORPTION MEDIUM FOR REMOVING ACID GASES

(75) Inventors: Hugo Rafael Garcia Andarcia, Mannheim (DE); Ute Lichtfers, Karlsruhe (DE); Georg Sieder, Bad Dürkheim (DE); Oliver Spuhl, Mannheim (DE); Steven Brughmans, Speyer (DE)

(73) Assignee: BASF SE (DE)

( * ) Notice: Subject to any disclaimer, the term of this patent is extended or adjusted under 35 U.S.C. 154(b) by 398 days.

(21) Appl. No.: 12/698,178

(22) Filed: Feb. 2, 2010

(65) Prior Publication Data

US 2010/0192770 A1 Aug. 5, 2010

(30) Foreign Application Priority Data

Feb. 2, 2009 (EP) .................................. 09151885
Apr. 29, 2009 (EP) .................................. 09159104

(51) Int. Cl.
  *B01D 53/14* (2006.01)
(52) U.S. Cl.
  USPC ................ 95/236; 423/228; 252/60; 252/184
(58) Field of Classification Search
  USPC ............ 95/92, 236, 230, 161, 178, 172, 173, 95/160, 165, 159; 252/60; 423/228, 229
  See application file for complete search history.

(56) References Cited

U.S. PATENT DOCUMENTS

| | | | |
|---|---|---|---|
| 4,096,085 A * | 6/1978 | Holoman, Jr. et al. | 252/189 |
| 5,603,908 A * | 2/1997 | Yoshida et al. | 423/220 |
| 5,618,506 A * | 4/1997 | Suzuki et al. | 423/228 |
| 7,906,086 B2 * | 3/2011 | Comrie | 423/210 |
| 8,034,166 B2 * | 10/2011 | Asprion et al. | 95/236 |
| 2006/0138384 A1 * | 6/2006 | Grossman et al. | 252/190 |
| 2008/0025893 A1 | 1/2008 | Asprion et al. | |
| 2009/0068078 A1 * | 3/2009 | Grobys et al. | 423/220 |
| 2009/0199711 A1 | 8/2009 | Asprion et al. | |
| 2009/0199713 A1 * | 8/2009 | Asprion et al. | 95/236 |

FOREIGN PATENT DOCUMENTS

| | | | |
|---|---|---|---|
| EP | 0 558 019 A2 | 9/1993 | |
| WO | WO-2005/087349 A1 | 9/2005 | |
| WO | WO 2007134994 | * 11/2007 | ............. B01D 53/14 |
| WO | WO-2007/144372 A1 | 12/2007 | |

* cited by examiner

*Primary Examiner* — Duane Smith
*Assistant Examiner* — Joubert X Glover
(74) *Attorney, Agent, or Firm* — Novak Druce Connolly Bove + Quigg LLP

(57) ABSTRACT

An absorption medium for removing acid gases from a fluid stream comprises an aqueous solution of A) at least one cyclic amine compound having solely tertiary amine groups and/or sterically hindered secondary amine groups and B) at least one cyclic amine compound having at least one sterically unhindered secondary amine group. The absorption medium comprises, e.g., an aqueous solution of A) 1-hydroxyethylpiperidine and/or triethylenediamine and B) piperazine. The absorption medium is particularly suitable for separating off carbon dioxide from flue gases and satisfies the following criteria: (i) sufficient capacity at low $CO_2$ partial pressures; (ii) sufficiently rapid absorption rate at low $CO_2$ partial pressures; (iii) stability toward oxygen; (iv) low vapor pressure for reducing solvent losses; and (v) low energy requirement for regeneration of the absorption medium.

19 Claims, 2 Drawing Sheets

CYCLIC-AMINE-COMPRISING ABSORPTION MEDIUM FOR REMOVING ACID GASES

CROSS-REFERENCE TO RELATED APPLICATIONS

This application claims benefit of European application 09151885.2, filed Feb. 2, 2009 and European application 09159104.0, filed Apr. 29, 2009 which are incorporated by reference in its entirety.

BACKGROUND OF THE INVENTION

The present invention relates to a method of removing acid gases from fluid streams, in particular a method of removing carbon dioxide from flue gases.

The removal of carbon dioxide from flue gases is desirable for many reasons, in particular, however, for reducing the emission of carbon dioxide which is considered to be the main cause of what is termed the greenhouse effect.

On an industrial scale, use is frequently made of aqueous solutions of organic bases, e.g. alkanolamines, as absorption media for removing acid gases, such as carbon dioxide, from fluid streams. When acid gases are dissolved, ionic products are formed from the base and the acid gas components. The absorption medium can be regenerated by heating, expansion to a lower pressure or by stripping, wherein the ionic products react back to form acid gases and/or the acid gases are stripped off by means of steam. After the regeneration process, the absorption medium can be reused.

Flue gases have very low carbon dioxide partial pressures since they generally occur at a pressure close to atmospheric pressure and typically comprise 3 to 20% by volume of carbon dioxide. In contrast to fluids such as natural gas or synthesis gas, flue gases additionally comprise oxygen. The oxygen also dissolves in small traces in the absorption medium and can lead there, at elevated temperatures, to a degradation of the amine. An absorption medium for separating off carbon dioxide from flue gases should satisfy the following criteria: (i) sufficient capacity at low $CO_2$ partial pressures; (ii) sufficiently rapid absorption rate at low $CO_2$ partial pressures; (iii) stability to oxygen; (iv) low vapor pressure for reducing solvent losses; and (v) low energy requirement for regenerating the absorption medium.

A technology based on monoethanolamine (MEA) is known under the name Fluor Econamine for separating off carbon dioxide from flue gases (cf. e.g. Second National Conference on Carbon Sequestration, National Energy Technology Department of Energy, Alexandria Va., USA, May 5-8, 2003 under the title: Fluor's Econamine FG Plus$^{SM}$ Technology; An Enhanced Amine-Based $CO_2$ Capture Process).

Mixtures of MDEA and piperazine are described in the literature as solvents which are likewise suitable for separating off $CO_2$ from flue gases (Closman, F.; Nguyen, T.; Rochelle, G. T: MDEA/piperazine as a solvent for $CO_2$ capture, GHGT-9, Washington D.C., USA 2008, Nov. 16-20).

Although technologies based on monoethanolamine are distinguished by high reactivity between the amine and carbon dioxide, the high reactivity is disadvantageously accompanied with high absorption enthalpy and thereby a high energy requirement for regeneration. Other alkanolamines such as, for instance, diethanolamine or methyldiethanolamine, which have a lower energy requirement for regeneration, are suitable only with restrictions for this separation task owing to their slower reaction kinetics between carbon dioxide and amine.

EP-A 558019 describes aqueous solutions of sterically hindered amines for removing carbon dioxide from flue gases.

WO 2007/144372 discloses a method of removing carbon dioxide from a gas stream in which the partial pressure of the carbon dioxide in the gas stream is less than 200 mbar, e.g. from flue gas, by contacting it with an aqueous solution of a tertiary aliphatic alkanolamine and an activator, in particular 3-methylaminopropylamine.

WO 2005/087349 describes a method of removing carbon dioxide from a gas stream in which the partial pressure of the carbon dioxide in the gas stream is less than 200 mbar, wherein the gas stream is contacted with a liquid absorption medium which comprises an aqueous solution (A) of an amine compound having at least two tertiary amino groups in the molecule and (B) of an activator which is selected from primary and secondary amines.

BRIEF SUMMARY OF THE INVENTION

The object of the present invention is to specify an absorption medium for removing acid gases from fluid streams, in particular for removing carbon dioxide from flue gases, which absorption medium complies with the above requirements better than the absorption media which are known from the prior art.

The invention provides an absorption medium for removing acid gases from a fluid, which absorption medium comprises an aqueous solution of
A) at least one cyclic amine compound having solely tertiary amine groups and/or sterically hindered secondary amine groups and
B) at least one cyclic amine compound having at least one sterically unhindered secondary amine group.

DETAILED DESCRIPTION OF THE INVENTION

Figure 1:
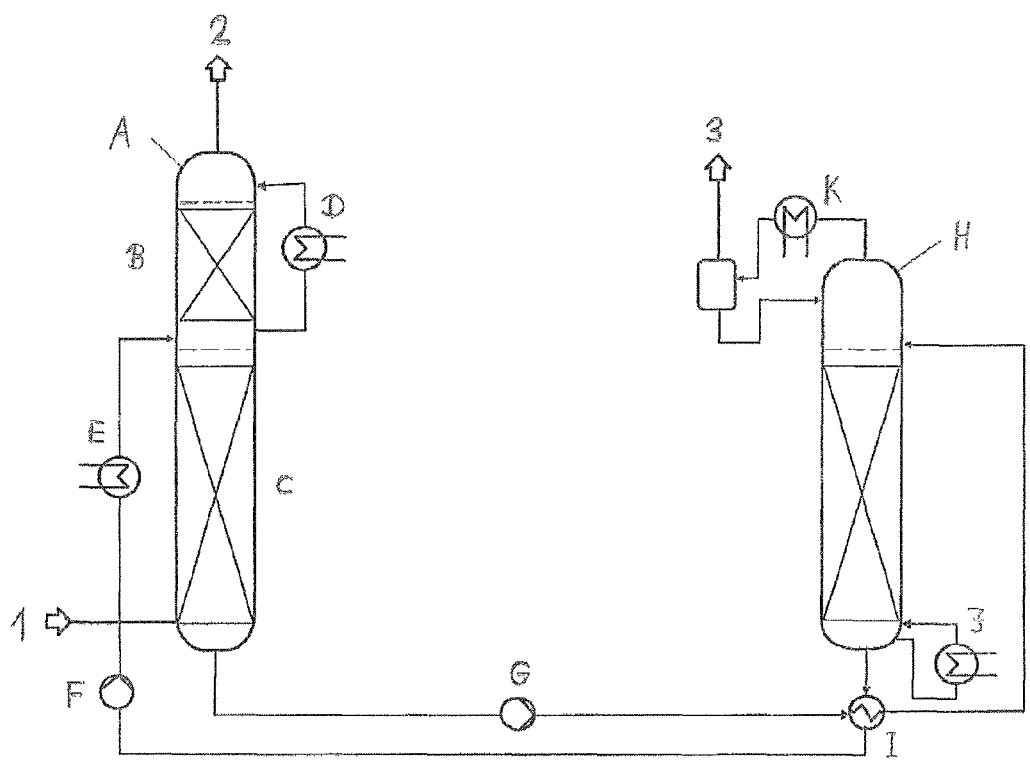
FIG. 1 shows a plant suitable for carrying out the method according to the invention.

The cyclic amine compound A) preferably has a molar mass of 250 g/mol or less. The cyclic amine compound B) preferably has a molar mass of 200 g/mol or less.

The cyclic amine compounds used according to the invention comprise a saturated heterocycle having at least one nitrogen atom as ring atom. Tertiary amine groups are taken to mean in the present case amine groups in which the nitrogen atom is bound to three adjacent carbon atoms. Sterically hindered secondary amine groups are taken to mean in the present case amine groups in which the nitrogen atom is bound to two adjacent carbon atoms and at least one carbon atom ($\alpha$-carbon) which is adjacent to the nitrogen atom bears no more than one hydrogen atom. In other words, at least one $\alpha$-carbon bears at least one exocyclic substituent which is different from hydrogen. Sterically unhindered secondary amine groups are those in which all $\alpha$-carbons are present as $CH_2$ groups.

The weight ratio of A) to B) is preferably 0.5 to 4, in particular 1 to 3.

Generally, the total concentration of A)+B) is 10 to 60% by weight, preferably 20 to 45% by weight.

The amine compounds are used in the form of their aqueous solutions. The solutions can additionally comprise physical solvents which are selected, e.g. from cyclotetramethylene sulfone (sulfolane) and derivatives thereof, aliphatic acid amides (acetylmorpholine, N-formylmorpholine), n-alkylated pyrrolidones and corresponding piperidones, such as N-methylpyrrolidone (NMP), propylene carbonate, methanol, dialkyl ethers of polyethylene glycols and mixtures thereof. In certain embodiments, the absorption medium does not comprise a physical solvent, i.e. the absorption medium comprises essentially the amine compounds A) and B) and water.

In preferred embodiments, the cyclic amine compound A) has a 5- to 7-member ring of the general formula I,

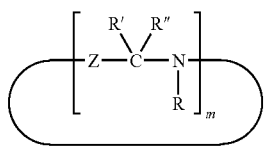

where m is 1, 2 or 3; R is H, $C_1$-$C_4$-alkyl or $C_2$-$C_4$-hydroxyalkyl; or, in the event that m is 2, two moieties R together can form a $C_2$-$C_3$-alkylene bridge; R' is H, $C_1$-$C_4$-alkyl or $C_2$-$C_4$-hydroxyalkyl; R" is H or $C_1$-$C_4$-alkyl; Z is a bond or $C_1$-$C_6$-alkylene with the proviso that, in each repeating unit, at least one of the moieties R, R' or R" is different from H.

Specific examples of the cyclic amine compound A) are:

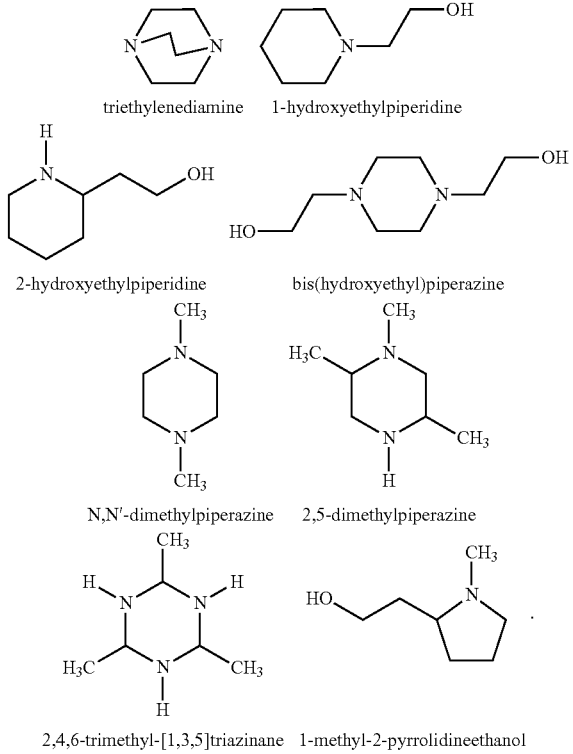

In preferred embodiments, the cyclic amine compound B) has the general formula II,

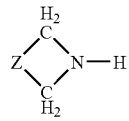

where Z is $C_2$-$C_4$-alkylene which is optionally interrupted by 0 or a group NR''', where R''' is H, $C_1$-$C_4$-alkyl or $C_2$-$C_4$-hydroxyalkyl, and which is optionally monosubstituted or polysubstituted by $C_1$-$C_4$-alkyl or $C_2$-$C_4$-hydroxyalkyl.

Specific examples of the cyclic amine compound B) are:

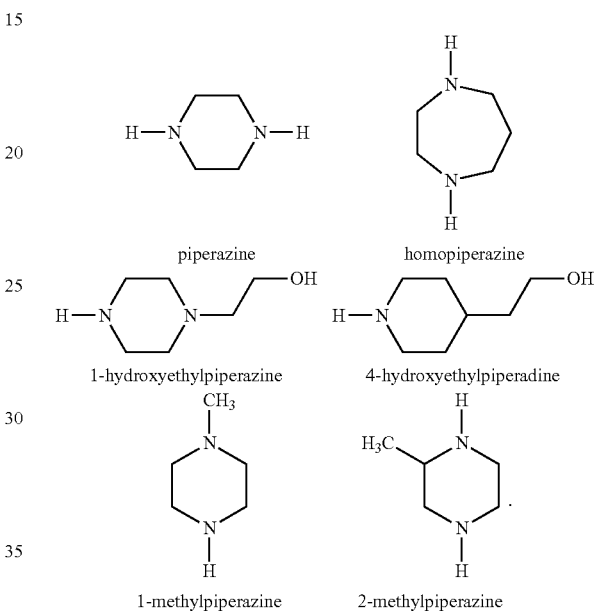

Absorption media which are particularly preferred according to the invention comprise an aqueous solution of
A) 1-hydroxyethylpiperidine and/or triethylenediamine; and
B) piperazine.

The absorption medium can also comprise additives, such as corrosion inhibitors, enzymes, etc. Generally, the amount of such additives is in the range of about 0.01-3% by weight of the absorption medium.

The invention also relates to a method of removing acid gases, in particular carbon dioxide, from a fluid stream, which comprises bringing the fluid stream into contact with an above-defined absorption medium.

The method or absorption medium according to the invention is suitable for treating fluids, in particular gas streams of all types. The acid gases are, in particular, $CO_2$, $H_2S$, COS and mercaptans. In addition, $SO_3$, $SO_2$, $CS_2$ and HCN can also be removed.

Fluids which comprise the acid gases are, firstly, gases, such as natural gas, synthesis gas, coke oven gas, cracked gas, coal gasification gas, cycle gas, landfill gases and combustion gases, and secondly liquids which are essentially immiscible with the absorption medium, such as LPG (liquefied petroleum gas) or NGL (natural gas liquids).

The process or absorption medium according to the invention is particularly suitable for the treatment of oxygen-comprising fluid streams.

In preferred embodiments, the fluid stream originates from
a) the oxidation of organic substances, b) the composting or storage of waste materials comprising organic substances, or c) the bacterial decomposition of organic substances.

In some embodiments, the partial pressure of carbon dioxide in the fluid stream is less than 500 mbar, e.g. 30 to 150 mbar.

The oxidation can be carried out with flames, i.e. as conventional combustion, or as oxidation without flames, e.g. in the form of a catalytic oxidation or partial oxidation. Organic substances which are subjected to the combustion are customarily fossil fuels such as coal, natural gas, petroleum, gasoline, diesel, raffinates or kerosene, biodiesel or waste materials having a content of organic substances. Starting materials of the catalytic (partial) oxidation are, e.g., methanol or methane which can be reacted to form formic acid or formaldehyde.

Waste materials which are subjected to oxidation, composting or storage, are typically domestic refuse, plastic waste or packaging waste.

The organic substances are usually burnt in customary combustion plants with air. Composting and storage of waste materials comprising organic substances generally proceeds at refuse landfill sites. The exhaust gas and/or the exhaust air of such plants can advantageously be treated by the method according to the invention.

As organic substances for bacterial decomposition, use is made customarily of stable manure, straw, liquid manure, sewage sludge, fermentation residues and the like. The bacterial decomposition proceeds, e.g., in conventional biogas plants. The exhaust air of such plants can be treated advantageously by the method according to the invention.

The method is also suitable for treating the exhaust gases of fuel cells or chemical synthesis plants which are used for a (partial) oxidation of organic substances.

The fluid streams of the above origins a), b) or c) can have, for example, either the pressure which roughly corresponds to the pressure of the ambient air, that is to say, e.g., atmospheric pressure, or a pressure which deviates from atmospheric pressure by up to 1 bar therefrom.

Devices suitable for carrying out the method according to the invention comprise at least one scrubbing column, e.g. dumped packing, arranged packing and tray columns, and/or other absorbers such as membrane contactors, radial flow scrubbers, jet scrubbers, venturi scrubbers and rotary spray scrubbers. The gas stream is treated with the absorption medium in this case preferably in a scrubbing column in countercurrent flow. The gas stream in this case is generally fed into the bottom region of the column and the absorption medium into the top region of the column.

The temperature of the absorption medium in the absorption step is generally about 30 to 70° C., for example 30 to 60° C. at the top of the column and 40 to 70° C. at the bottom of the column when a column is used. A product gas (associated gas) which is low in acid gas constituents, i.e. depleted in these constituents, and an absorption medium loaded with acid gas constituents are obtained.

In an advantageous embodiment, the acid gas is removed in a scrubbing column operated in countercurrent flow, in which, in the interior a discontinuous liquid phase forms, in the presence of activated carbon which is present in the interior of the scrubbing column. The scrubbing column to be used additionally comprises the customarily used internals such as, for example, dumped packings or arranged packings. The activated carbon preferably has a carbon content of greater than 90% by weight and a BET surface area of 300 to 2000 $m^2/g$. The concentration thereof is generally 1 to 2000 g of activated carbon per $m^3$ of volume of the scrubbing column. The activated carbon can be fed in various ways. In a preferred embodiment it is suspended in the liquid absorption medium. In this case the particle size thereof is preferably in the range from 0.1 to 1000 μm, particularly preferably 0.1 to 50 μm. Based on the liquid absorption medium, the concentration of the suspended activated carbon is preferably 0.01 to 20 kg per $m^3$, particularly preferably 1 to 10 kg per $m^3$. In another preferred embodiment it is applied in a spatially fixed form within the scrubbing column. In this case the activated carbon is situated, for example, in fixed liquid- and gas-permeable pockets (for instance in the form of activated carbon pellets) or in arranged packings or dumped packings coated with activated carbon and fixed in the scrubbing column. Based on the volume of the scrubbing column the concentration of the fixed activated carbon is preferably 1 g to 2 kg per $m^3$, particularly preferably 100 g to 1 kg per $m^3$. The presence of activated carbon increases the absorption rate of the liquid absorption medium which leads to a still more effective process procedure. Further details on the use of activated carbon in absorption of acid gases in aqueous alkaline absorption media are described in the European patent having the file number EP 09 154 427.0.

From the absorption medium which is loaded with the acid gas constituents, the carbon dioxide can be released in a regeneration step, wherein a regenerated absorption medium is obtained. In the regeneration step the loading of the absorption medium is decreased and the resultant regenerated absorption medium is preferably subsequently recirculated to the absorption step.

Generally, the loaded absorption medium is regenerated by a) heating, for example to 70 to 130° C.

b) expanding, c) stripping with an inert fluid or a combination of two or all of these measures.

Generally, the loaded absorption medium is heated for regeneration and the carbon dioxide which is released is separated off, e.g. in a desorption column. Before the regenerated absorption medium is reintroduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. By means of the heat exchange the loaded absorption medium is brought to a higher temperature so that in the regeneration step a lower energy input is required. Also by means of the heat exchange, a partial regeneration of the loaded absorption medium can already proceed with release of carbon dioxide. The resultant gas-liquid mixed-phase stream is passed into a phase separation vessel from which the carbon dioxide is taken off; the liquid phase is passed into the desorption column for complete regeneration of the absorption medium.

Before the absorption medium treatment according to the invention, the flue gas is preferably subjected to a scrubbing with an aqueous liquid, in particular water, in order to cool down the flue gas and moisten it (quenching). During the scrubbing, dusts or gaseous impurities such as sulfur dioxide can also be removed.

The invention will be illustrated in more detail by the accompanying drawings and the examples hereinafter.

FIG. 1 shows a plant suitable for carrying out the method according to the invention.

Figure 2:
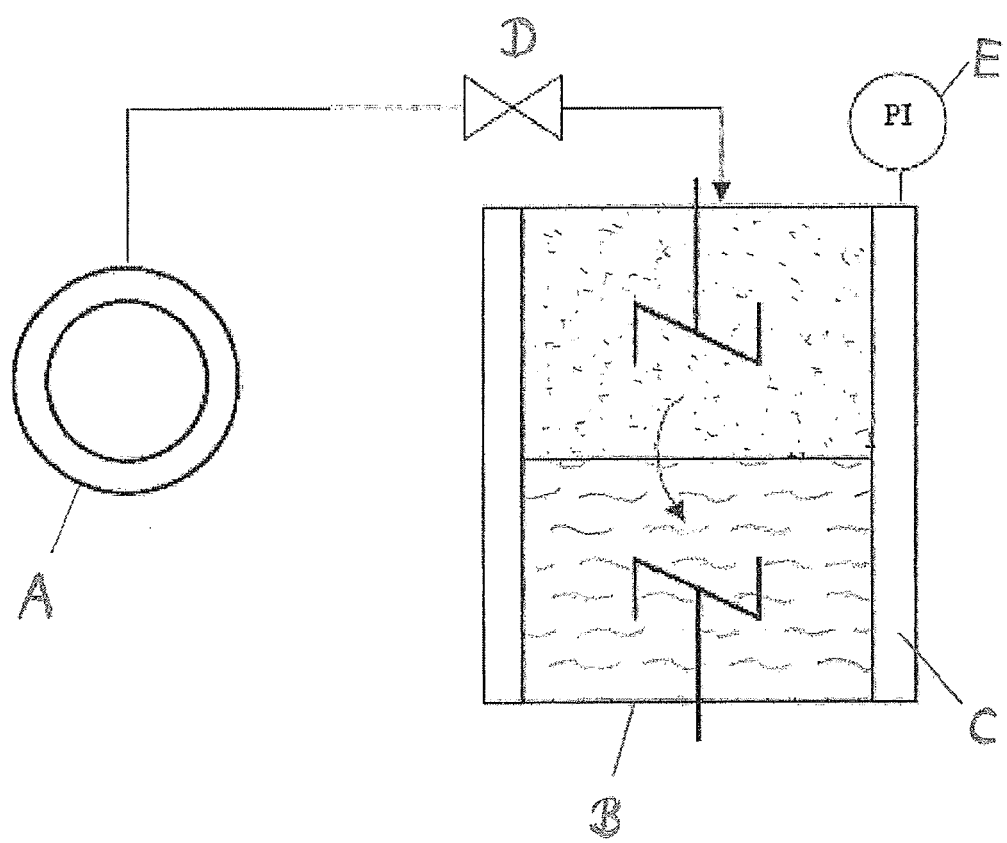
FIG. 2 shows a schematic diagram of a double stirred cell which serves for determining the relative absorption rates of various absorption media.

FIG. 2 shows a schematic diagram of a double stirred cell which serves for determining the relative absorption rates of various absorption media.

In FIG. 1, the reference signs used have the following meaning:

1=Flue gas
2=Flue gas low in carbon dioxide
3=Separated carbon dioxide
A=Absorption column
B=Water scrubber
C=Absorption
D=Cooler
E=Cooler
F=Pump
G=Pump
H=Desorption column
I=Heat exchanger
J=Evaporator (reboiler)
K=Condenser According to FIG. 1, flue gas 1 is passed into the bottom part of the absorption column A and brought into contact with the absorption medium in countercurrent flow. The flue gas depleted in carbon dioxide is scrubbed with water in the top part of the absorption column and passed overhead out of the column as stream 2. The absorption medium which is loaded with carbon dioxide is taken off at the bottom of the absorption column A and passed via the pump G and the heat exchanger I to the desorption column H. In the bottom part of the desorption column, the loaded absorption medium is heated via the evaporator J. By means of the temperature elevation, some of the absorbed carbon dioxide converts again to the gas phase. This gas phase is removed at the top of the desorption column H and cooled in the condenser K. Absorption medium which is condensed out is recirculated back to the top. The gaseous carbon dioxide is taken off as stream 3. The regenerated absorption medium is recirculated back to the absorption column A via the pump F and the cooler E.

In FIG. 2, the reference signs used have the following meaning:
A=Carbon dioxide reservoir vessel
B=Double stirred cell
C=Thermostatting
D=Metering valve
E=Pressure meter In the double stirred cell B there is situated a bottom liquid phase of the absorption medium under test which is in contact with the gas phase thereabove via a phase interface. Liquid phase and gas phase can each be mixed by a stirrer. The double stirred cell B is connected via the metering valve D to a carbon dioxide reservoir vessel. The pressure in the double stirred cell B can be determined using the pressure meter E. In the measurement, the volumetric flow rate of carbon dioxide is recorded which is set in order to maintain a preset pressure in the double stirred cell B.

In the examples, the following abbreviations are used:
MEA=monoethanolamine
MDEA=methyldiethanolamine
TEDA=triethylenediamine
1-HEPi=1-hydroxyethylpiperidine
PIP=piperazine
MPE=1-methyl-2-pyrrolidineethanol
AC=activated carbon Example 1

Relative Cycle Capacity and Relative Steam Rate Requirement for Regeneration in Absorption Media According to the Invention and not According to the Invention For determination of the carbon dioxide cycle capacity and the regeneration requirement, laboratory experiments were carried out using various absorption media loaded with carbon dioxide. The comparison base used is a 30% strength by weight solution of monoethanolamine in water and also a piperazine-activated methyldiethanolamine solvent.

For determination of the relative cycle capacity and estimation of the relative steam rate requirement for regeneration of the absorption medium, the equilibrium loadings of carbon dioxide in the absorption medium were determined as a function of the carbon dioxide partial pressure at 40° C. (for absorber bottom) and 120° C. (for desorber bottom). These measurements were carried out for all of the systems listed in table 1. For determination of the equilibrium loading, use was made of a glass pressure vessel having a volume of approximately 100 cm$^3$. In this a defined amount of the absorption medium is charged, the vessel is evacuated and, at constant temperature, carbon dioxide was added stepwise via a defined gas volume. The amount of carbon dioxide dissolved in the liquid phase was calculated taking into account the gas space correction via the upper gas phase.

For estimations of the cycle capacity of the absorption medium, the following assumptions were made:
1. The absorber is charged at a total pressure of one bar with a carbon dioxide-comprising flue gas having a carbon dioxide partial pressure of 130 hPa (approximately equivalent to 13% by volume of carbon dioxide in the flue gas at atmospheric pressure).
2. In the absorber bottom a temperature of 40° C. prevails.
3. During the regeneration a temperature of 120° C. prevails in the desorber bottom.
4. In the absorber bottom an equilibrium state is achieved. The carbon dioxide equilibrium partial pressure is therefore equal to the feed gas partial pressure of 130 hPa.
5. During the desorption a carbon dioxide partial pressure of 100 hPa in the desorber bottom prevails.
6. During the desorption an equilibrium state is achieved.

The capacity of the absorption medium was determined from the loading (in m$^3$ (S.T.P.) of carbon dioxide/t of absorption medium) at the point of intersection of the 40° C. equilibrium curve with the line of the constant feed gas carbon dioxide partial pressure of 13 kPa (loaded solution at the absorber bottom in equilibrium) and from the loading at the point of intersection of the 120° C. equilibrium curve with the line of constant partial pressure of 100 hPa (regenerated solution at the desorber bottom in equilibrium). The difference between the two loadings is the cycle capacity of the respective solvent. A high capacity means that less solvent needs to be circulated and the apparatuses such as, for example, pumps, heat exchangers, and also piping, can thereby be dimensioned to be smaller. In addition, the circulation rate also influences the energy required for regeneration.

A further measure of the application properties of an absorption medium is the gradient of the operating lines in the McCabe-Thiele diagram of the desorber. For the conditions in the bottom of the desorber, the working line is generally very close to the equilibrium line, and therefore the gradient of the equilibrium curve can to an approximation be made equivalent to the gradient of the working lines. At a constant liquid loading, for regeneration of an absorption medium having a high gradient of the equilibrium curve, a lower stripping steam rate is required. The energy requirement for generating the stripping steam makes a significant contribution to the total energy requirement of the carbon dioxide absorption process.

Expediently, the reciprocal of the gradient is quoted, since this is directly proportional to the required steam rate per kilogram of absorption medium. If the reciprocal is divided by the capacity of the absorption medium, this gives a comparison value which directly enables a relative statement of the required amount of steam per amount of carbon dioxide absorbed.

Table 1 shows the values of the relative cycle capacity and the relative steam rate requirement (normalized to MEA) for absorption media according to the invention.

The relative cycle capacity when a solvent according to the invention is used is between 3 and 46% greater compared with 30% by weight of MEA. The relative steam rate requirement is significantly lower for the solvents according to the invention than for the comparative solvent MEA, which represents an enormous potential saving in industrial application. The comparison absorbent of MDEA and piperazine likewise shows a marked improvement compared with monoethanolamine with respect to capacity and energy requirement.

Example 2

Relative Absorption Rates for Absorption Media According to the Invention and not According to the Invention For determining the mass transport rate of carbon dioxide from the gas stream into the absorption medium, measurements were carried out in a double stirred cell (FIG. 2). The mass transport rate, in the case of reactive absorption, is composed not only of physical mass transport, but also the reaction kinetics between the absorption medium and the carbon dioxide. These two variables can be measured in the double stirred cell as a summarizing parameter. The comparison bases used were 31.2% by weight of monoethanolamine (MEA) in water, and also 25% by weight of methyldiethanolamine with 15% by weight of piperazine in water. The absorption media according to the invention contained 15 to 30% by weight of the cyclic tertiary amine and 15% by weight of piperazine.

The double stirred cell had an internal diameter of 85 mm and a volume of 509 ml. The cell was thermostatted to 50° C. during the experiments. For mixing the gas and liquid phases, the cell was equipped with two stirrers according to the schematic diagram. Before the start of the experiment the double stirred cell was evacuated. A defined volume of the degassed absorption medium was run into the double stirred cell and thermostatted to 50° C. The stirrers were already switched on during heating up of the unloaded absorption medium. The rotary speed of the stirrer was selected in such a manner that a planar phase interface was formed between the liquid phase and the gas phase. Wave formation at the phase interface must be avoided, since as a result there would not be a defined phase interface. After the desired experimental temperature had been reached, carbon dioxide was introduced into the reactor via a control valve. The volumetric flow rate was controlled in such a manner that a constant pressure of 50 hPa abs (corresponds to carbon dioxide partial pressure) prevailed in the double stirred cell during the experiment. With increasing experimental time, the volumetric flow rate of carbon dioxide decreased, since the absorption medium became saturated with time and therefore the absorption rate decreased. The volumetric flow rate of carbon dioxide which flowed into the double stirred cell was recorded over the entire experimental period. The end of the experiment was reached as soon as carbon dioxide no longer flowed into the double stirred cell. The absorption medium was virtually in the equilibrium state at the end of the experiment.

For evaluation of the experiments, the absorption rate in mol of $CO_2/(m^3$ absorption medium·min) was determined as a function of the loading of the absorption medium. The absorption rate was calculated from the recorded volumetric flow rate of carbon dioxide and the volume of absorption medium charged. The loading was determined from the cumulative amount of carbon dioxide which had been fed into the double stirred cell and the mass of absorption medium charged.

Table 2 shows the median relative absorption rates of various absorption media, normalized to the median absorption rate of 25% strength by weight MDEA/15% strength by weight PIP. The median absorption rate was determined as follows: starting from the maximum loading of the absorption medium (virtually equilibrium state at a $CO_2$ partial pressure of 50 hPa and a temperature of 50° C.) the absorption rates were determined at 75, 50 and 20% loading of the maximum loading and the mean taken. Absorption rates at less than 20% loading were not taken into account in the taking of the mean, since the absorption medium in the industrial process passes into the absorption apparatus with a residual loading of $CO_2$.

Compared with the MDEA/PIP absorption medium, the absorption rates of the absorption media according to the invention are greater, sometimes even greater than that of monoethanolamine which is highly reactive to $CO_2$.

For the absorption medium comprising 15% by weight of PIP and 25% by weight of TEDA and 0.1% by weight of activated carbon, a further increase in the absorption rates could be observed compared with an absorption medium comprising 15% by weight of PIP and 25% by weight of TEDA. Adding the activated carbon increased the absorption rate by more than the factor 2.

Taking into account example 1, it is clear that the absorption media according to the invention, when all three criteria—cyclic capacity, regeneration requirement and absorption rate—are considered, exhibit advantages not only over MEA but also the mixture comprising MDEA and PIP. For instance, although an aqueous MEA solution would have a very high absorption rate, it would likewise have a high energy requirement on regeneration. Vice versa, an aqueous mixture of MDEA and PIP would have only an insufficiently low absorption rate which, in conversion to an industrial scale, would require a significantly larger absorber column. Examples 1 and 2 verify that by using a corresponding mixture, surprisingly, a very balanced absorption medium is obtained which not only has a high absorption rate but also requires a very low energy requirement for regeneration.

Example 3

Oxygen Stability of Absorption Media According to the Invention and not According to the Invention For study of the oxygen stability of the aqueous amine mixtures, the studies described hereinafter were carried out. About 150 ml of the absorption media were charged into an autoclave which was heatable by an oil bath. At a temperature of 40° C., a gas mixture (V=7.5 l (S.T.P.)/h) comprising 33% by volume of $CO_2$, 14% by volume of oxygen and 53% by volume of nitrogen was passed into this sample, in addition the liquid was blanketed with 10 l (S.T.P.)/h of nitrogen. A metal frit was used for distributing the gas into the entire liquid. A reflux cooler which is operated at a temperature of 4° C. is situated above the autoclave to prevent absorption losses. The concentration of $CO_2$ at the outlet of the reflux cooler is determined by means of an IR probe. As soon as the absorption medium is completely loaded with $CO_2$, the $CO_2$ concentration measured by the IR probe increases abruptly. The feed of gas is stopped and the sample is heated up to 100° C. For stripping the sample, solely nitrogen is introduced into the absorption medium. During stripping of the sample, the concentration at the exit of the reflux cooler is likewise monitored by the IR probe. As soon as the $CO_2$ concentration is virtually 0, the contents of the autoclave are cooled to 40° C. and the cycle is repeated again. The absorption process and desorption process are adjusted by means of this cycle. After each cycle a small sample of the absorption medium is withdrawn and analyzed by means of gas chromatography for its constituents (amine contents). These experiments are carried out over several hundred hours and thereby permit a statement about the stability of the absorption medium. A cumulative parameter for the stability is thereby determined, since not only the oxygen stability, the thermal stability and also the stability of the amine toward $CO_2$ is determined.

For the examples listed in table 3, in each case an experimental series was carried out in which at least 2 autoclaves were operated in parallel. One autoclave was operated with a 30% strength by weight monoethanolamine solution and the second with an absorption medium under test. As a measure, the relative amine loss of the amine compound A) was plotted in comparison with the loss of MEA. That is to say at 100%, the amine compound A) is just as stable as MEA and at 10%, more stable by a factor of 10.

The stability of piperazine has already been studied by Freeman et al. The results are described, inter alia, in Freeman, S. A.; Dugas, R. van Wagener, D., Nguyen, T.; Rochelle G. T.: Carbon dioxide capture with concentrated, aqueous piperazine, GHGT-9, 2008 Nov. 16-20, Washington D.C., USA. In these studies it was found that piperazine is 4 times more stable to oxygen compared with monoethanolamine and, compared with monoethanolamine, exhibits no thermal degradation.

TABLE 1

Relative cycle capacity and steam rate requirement normalized to MEA

| Composition in % by weight | Relative cycle capacity | Relative steam rate requirement |
| --- | --- | --- |
| 30% MEA | 100% | 100% |
| 25% MDEA + 15% PIP | 116% | 48% |
| 15% TEDA + 15% PIP | 103% | 60% |
| 25% TEDA + 15% PIP | 124% | 52% |
| 15% 1-HEPi + 15% PIP | 108% | 61% |
| 30% 1-HEPi + 15% PIP | 146% | 39% |
| 30% 2-HEPi + 15% PIP | 135% | 73% |
| 30% MPE + 15% PIP | 143% | 45% |

TABLE 2

Relative median absorption rate of various absorption media normalized to 25% by weight of MDEA and 15% by weight of PIP

| Composition in % by weight | Median relative absorption rate |
| --- | --- |
| 30% MEA | 181% |
| 25% MDEA + 15% PIP | 100% |
| 30% 1-HEPi + 15% PIP | 156% |
| 15% 1-HEPi + 15% PIP | 203% |
| 15% TEDA + 15% PIP | 167% |
| 25% TEDA + 15% PIP | 112% |
| 25% TEDA + 15% PIP + 0.1% AC* | 253% |

*Norit SA Super (BET surface area 1150 m²/g)

TABLE 3

Relative stability of tertiary cyclic amines compared with MEA

| Tertiary amine | Experimental period [h] | Stability = relative amine loss compared with MEA |
| --- | --- | --- |
| 1-HEPi | 650 | 11% |
| TEDA | 350 | 3% |
| MPE | 300 | 47% |

The invention claimed is:

1. An absorption medium for removing acid gases from a fluid stream, which absorption medium comprises an aqueous solution of
   A) at least one cyclic amine compound is selected from the group consisting of:
   triethylenediamine, 1-hydroxyethylpiperidine, N,N'-dimethylpiperazine and 1-methyl-2-pyrrolidineethanol, and
   B) at least one cyclic amine compound having at least one sterically unhindered secondary amine group and
   wherein the total concentration of A)+B) is 10 to 60% by weight.

2. The absorption medium according to claim 1, wherein the weight ratio of A) to B) is 0.5 to 4.

3. The absorption medium according to claim 1, wherein the total concentration of A)+B) is 20 to 45% by weight.

4. The absorption medium according to claim 1, wherein the cyclic amine compound B) has the formula II

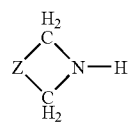

II where Z is $C_2$-$C_4$-alkylene which is optionally interrupted by O or a group NR''', where R''' is H, $C_1$-$C_4$-alkyl or $C_2$-$C_4$-hydroxyalkyl, and which is optionally monosubstituted or polysubstituted by $C_1$-$C_4$-alkyl or $C_2$-$C_4$-hydroxyalkyl.

5. The absorption medium according to claim 4, wherein the cyclic amine compound B) is selected from the group consisting of piperazine, homopiperazine, 1-hydroxyethylpiperazine, 4-hydroxyethylpiperidine, 1-methylpiperazine and 2-methylpiperazine.

6. The absorption medium according to claim 1, comprising an aqueous solution of
   A) 1-hydroxyethylpiperidine and/or triethylenediamine; and
   B) piperazine.

7. A method of removing acid gases from a fluid stream, which comprises bringing the fluid stream into contact with an absorption medium according to claim 1.

8. The method according to claim 7, wherein a partial pressure of carbon dioxide in the fluid stream is less than 500 mbar.

9. The method according to claim 7, wherein the fluid stream originates from
   a) the oxidation of organic substances,
   b) the composting or storage of waste materials comprising organic substances, or
   c) the bacterial decomposition of organic substances.

10. The method according to claim 7, wherein the fluid stream is brought into contact with the absorption medium in a scrubbing column operated in countercurrent flow in the presence of activated carbon which is present in the interior of the scrubbing column, wherein a discontinuous liquid absorption medium phase forms in the interior of the scrubbing column.

11. The method according to claim 7, wherein the absorption medium is loaded with carbon dioxide and is regenerated by
 a) heating,
 b) expanding,
 c) stripping with an inert fluid
or a combination of two or all of these steps.

12. An absorption medium for removing acid gases from a fluid stream, which absorption medium consists essentially of
 (A) at least one cyclic amine compound is selected from the group consisting of:
 triethylenediamine, 1-hydroxyethylpiperidine, N,N'-dimethylpiperazine and 1-methyl-2-pyrrolidineethanol, and
 (B) at least one cyclic amine compound having at least one sterically unhindered secondary amine group,
in the form of an aqueous solution wherein the total concentration of A)+B) is 10 to 60% by weight.

13. The absorption medium according to claim 1, wherein the total concentration of A)+B) is 20 to 60% by weight.

14. The absorption medium according to claim 12, wherein the total concentration of A)+B) is 20 to 60% by weight.

15. The absorption medium according to claim 12, wherein the total concentration of A)+B) is 20 to 45% by weight.

16. The absorption medium according to claim 1, wherein said at least one cyclic amine compound is triethylenediamine.

17. The absorption medium according to claim 1, a wherein said t least one cyclic amine compound is 1-hydroxyethylpiperidine.

18. The absorption medium according to claim 1, wherein said at least one cyclic amine compound is N,N'-dimethylpiperazine.

19. The absorption medium according to claim 1, wherein said at least one cyclic amine compound is 1-methyl-2-pyrrolidineethanol.

* * * * *